March 22, 1949.  A. H. HEINEMAN  2,464,809
REMOVABLE PANEL FOR TEST VESSEL
Filed May 25, 1945

Inventor:
Arnold H. Heineman,
By Chritton, Wiles, Schroeder,
Merriam & Hofgren, Attys.

Patented Mar. 22, 1949

2,464,809

UNITED STATES PATENT OFFICE 2,464,809

REMOVABLE PANEL FOR TEST VESSELS

Arnold H. Heineman, Chicago, Ill., assignor, by mesne assignments, to Guardite Corporation, Wilmington, Del., a corporation of Delaware Application May 25, 1945, Serial No. 595,754

4 Claims. (Cl. 73—116)

This invention relates to a removable panel for a test vessel, and particularly for one adapted to be alternately heated and cooled to sub and super atmospheric temperatures within which various objects may be tested in numerous ways.

In test chambers now employed for the armed services, and particularly in connection with aircraft engines, it is necessary to simulate high altitude conditions with the consequent low temperatures, and also to produce simulated high humidity, high temperature conditions, and to change rapidly from one to the other within such chamber when engines and such other devices are to be tested under normal operating conditions. It is not contemplated that an operator will stay within the chamber so that all connections must be made with the outside. These connections frequently involve complicated piping. This piping may be changed from one test to another, and then back again to the first set of piping.

The present invention discloses a panel which may be removably mounted within the wall of the vessel and is provided with a set of piping connections so that one panel may be removed and another panel substituted in a short time without the necessity of making openings and welding air tight connections. This is particularly desirable in the preferred form of vacuum vessel in which there are inner and outer walls, the inner wall being a membrane which does not sustain pressure and which is separated from the outer wall by a sealed insulating chamber. It is obvious that installation of piping through such a system is a difficult process.

Figure 1:
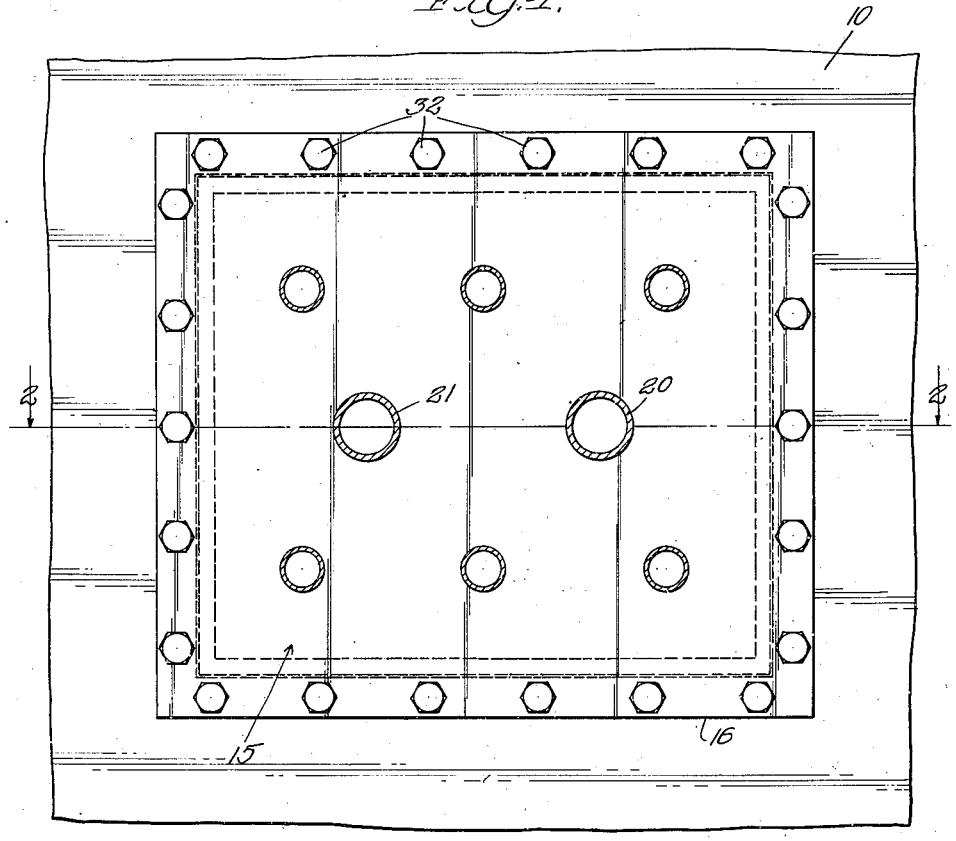
Figure 2:
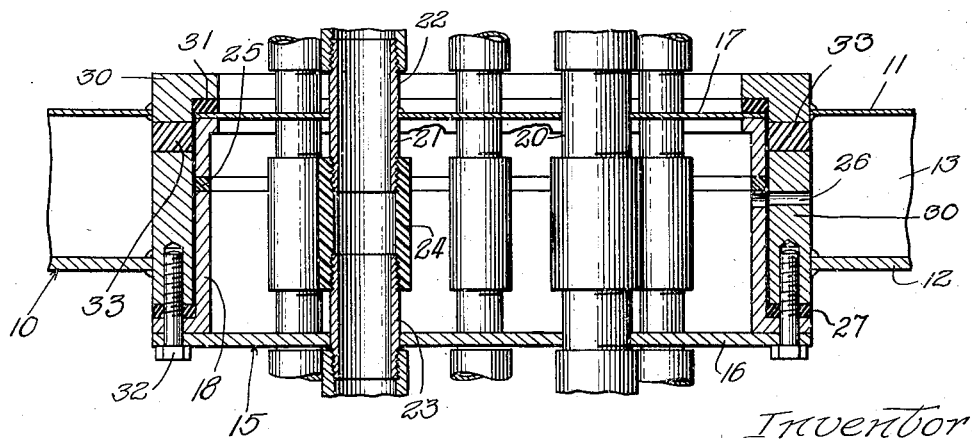

The invention is illustrated in the drawings in which Fig. 1 is a side elevation of a portion of the vacuum vessel illustrating the panel in place; and Fig. 2 is a section taken along the line 2—2 in Fig. 1.

As shown in the drawings the vacuum vessel 10 is provided with an inner membrane wall 11 and a stress carrying outer wall 12 which walls, together with the window frame 30, define an insulating chamber 13 provided with suitable insulation which supports the inner wall 11. Means are, of course, provided for evacuating the vacuum chamber, and independent means are provided for reducing the pressure within the insulating chamber 13 to a point below the pressure within the vacuum vessel. A suitable device is illustrated in my copending application Serial No. 498,146, filed August 11, 1943, issued April 20, 1948, as Patent 2,439,806.

The panel 15 includes an outer face plate 16, an inner face plate 17, connected by a frame 18. Suitable pipe connections 20, 21, etc., pass through the panel, as best shown in Fig. 2. Each of these pipe connections is treated at its end for connection to correspondingly mounted conduits within the vacuum vessel. The pipes are made up in three segments, the outer segments 22 and 23 of which may be of metal, and the inner segment 24 of which is a dithermal (non heat conducting) material, such as plastic. The three segments are suitably threaded together and the outer segments are welded to the faces 16 and 17. The frame 18 may likewise be provided with a plastic insert 25 which thus reduces heat transfer from the outside of the vessel to the inside. Any tension on the plastic insert 25 or the plastic pipe sections 24 is avoided by evacuating the inside of the panel to a pressure below that within the vacuum vessel. This may be done by an opening 26 between the chamber and the interior of the panel, or a flexible hose connection may be made between the chamber 13 and the interior of the panel. If an opening 26 is employed a gasket 27 must be provided between the frame 18 and the window frame 30.

The panel is mounted within the window frame 30 and is pressed against the gasket 31 by suitable means such as bolts 32. The frame 30 is preferably provided with a plastic insert 33 suitably secured to the metal inner and outer portions of the frame.

The foregoing detailed description has been given for clearness of understanding only, and no unnecessary limitations should be understood therefrom.

What I claim as new, and desire to secure by Letters Patent, is:

1. A removable panel, adapted to be mounted in an opening in a walled test vessel subject to rapid and frequent changes in temperature and pressure, comprising spaced inner and outer metal face plates connected by a sealed frame and a plurality of pipe connections passing through the panel, said pipes having a dithermal portion within the panel and metal end portions welded to the respective faces of the panel.

2. A panel as set forth in claim 1 in which the frame of the panel is provided with a dithermal segment intermediate the faces of the panel.

3. A panel as set forth in claim 1 in which an opening is provided for communication with a device for evacuating the interior of the panel to a pressure below that prevailing within the chamber whereby the tension on the pipe connection is avoided.

4. A panel having a metal inner face plate, a metal outer face plate and a metal frame joining the face plates, said frame having a dithermal element insert substantially severing metallic heat communication between the inner and outer face plates, a plurality of pipes passing through the panel, the portions of said pipes adjacent the inner and outer walls of the panel being metal and being welded to the walls, the metal portions of the pipes being separated by dithermal tubular elements within the panel.

ARNOLD H. HEINEMAN.

REFERENCES CITED

The following references are of record in the file of this patent:

UNITED STATES PATENTS

| Number | Name | Date |
|---|---|---|
| 500,488 | Gratiaa | June 27, 1893 |
| 2,359,239 | Newton | Sept. 26, 1944 |